Dec. 16, 1952     C. G. SONTHEIMER     2,621,518
LIQUID LEVEL GAUGE
Filed March 14, 1950

*INVENTOR.*
*Carl G. Sontheimer*
BY
*Robert S. Duncan*
ATTORNEYS

Patented Dec. 16, 1952

2,621,518

UNITED STATES PATENT OFFICE 2,621,518

LIQUID LEVEL GAUGE

Carl G. Sontheimer, Riverside, Conn., assignor to The Liquidometer Corporation, Long Island City, N. Y., a corporation of Delaware Application March 14, 1950, Serial No. 149,558

11 Claims. (Cl. 73—304)

This invention relates to apparatus for indicating and/or controlling the magnitude of a condition or the total magnitude of a plurality of more or less similar conditions, which condition or plurality of conditions are capable of controlling the value of the electrical reactance in a circuit. Particularly where the condition is arranged to control capacitance, a capacitor may be arranged to be responsive to the magnitude of each of a plurality of conditions, the total of which is to be indicated or used to effect a control. In such a system the capatitances may be connected in parallel with one another. The apparatus of the present invention is effective to translate the reactance in a circuit, responsive to the condition or conditions in question, into a variable frequency alternating signal, in which the frequency of the signal is a predetermined characteristic function of the magnitude of the condition or of the total magnitude of a plurality of conditions which is to be indicated and/or which is to be used to effect a control. The frequency of this alternating signal may then be translated by any suitable frequency responsive device, one of which is herein disclosed, into suitable electrical or mechanical force effective to operate an indicator and/or to effect a desired control. In apparatus of this kind an indicator and/or control equipment may be positioned remotely from the measuring equipment. The invention is described in detail as embodied in a capacitance-type gasoline gauge.

The depth of gasoline, or other liquid, can be measured by positioning a stationary condenser vertically in the fuel tank and allowing the liquid to flow into the space between the plates of the condenser, so that the level of the liquid between the plates varies in accordance with the depth of the liquid in the tank.

Such measurements are possible because the capacity of a condenser varies with the change in the dielectric constant of the material between the condenser plates. The dielectric constant of air has a value of one, but the dielectric constant of gasoline is approximately two; so when the space between the plates of the condenser is filled with gasoline, as when the tank is full, the capacity of the condenser is approximately twice as large as when the tank is empty and the space between the plates is filled with air.

By means of such a system the pilot of an aircraft can ascertain at any time the amount of gasoline in the fuel tanks of the aircraft. Various arrangements have been proposed, but have failed to satisfy all of the requirements of an ideal commercial system. To be commercially practicable, the system must be relatively simple in construction and light in weight so that it will not unduly increase the load of the aircraft nor require an inordinate amount of space. These requirements are relatively severe, because the measuring equipment must be located within the fuselage of the aircraft, and thus necessarily at a considerable distance from the measuring condensers which must be positioned within the fuel tanks. Therefore, there is likely to be considerable variation in the stray capacities between ground and the connecting-cables which extend between the condensers in the fuel tanks and the measuring equipment in the fuselage, and the characteristics of the measuring system must be such that these capacity changes do not cause such variations in the readings as to destroy the accuracy of the system. These problems were largely overcome by my earlier invention described in my co-pending patent application Serial No. 65,094, filed December 14, 1948, of which this application is a continuation-in-part, and which describes and claims a series resonant measuring circuit connected to a variable frequency oscillator, which is so constructed and arranged as to generate an alternating signal at the resonant frequency of the measuring circuit, i. e., the frequency at which the series measuring circuit presents a minimum impedance. The oscillator may, for example, be connected to any frequency-sensitive circuit or means capable of operating an indicator or control system. The present case discloses and claims a parallel connected pair of reactance elements arranged in a resonant circuit as compared with the series connections of said prior application. However, the arrangement described there does not readily lend itself to the construction of a system wherein it is desired, for example, to have the indicator denote the total amount of fuel in a number of separate tanks.

The present invention is peculiarly adaptable to a system for indicating the total capacitance of a number of remotely-positioned condensers, the indication being substantially independent of variations in the capacitances between the ground and the cables connect the remote condensers with the local measuring apparatus. In the illustrated embodiment of my invention, the total capacitance of the measuring condensers controls the frequency of a variable-frequency oscillator to which is connected a discriminator circuit which operates a ratiometer that can be calibrated directly in terms of the total quantity of fuel in the tanks. In order to distinguish the capacity between the two cables, which is a measure of the amount of fuel in the tanks, from the capacities between each of the cables and ground, the measuring condensers are insulated from ground and connected to an inductance to form an electrical circuit which has a very high impedance at one particular frequency which varies with changes in capacity of the measuring condensers, but which is substantially independent of changes in the stray capacities of the connecting cables.

One aspect of the present invention is directed to the measurement of the total capacity of two or more remotely-positioned condensers, and to the elimination of errors caused by variation in stray capacities between the condenser leads and ground. Another aspect is directed to simple, compact, and inexpensive apparatus for making such capacitance measurements. These and other aspects, objects, and advantages of the present invention will be apparent from the following description considered in connection with the accompanying drawings in which:

Figure 1 shows a condenser comprising two concentric metal cylinders adapted to be positioned vertically in a fuel tank to measure the depth of the liquid in the tank;

Fig. 2 shows diagrammatically a circuit for determining the total capacity of three remotely-positioned condensers;

Fig. 3 shows a simplified diagram of a portion of the circuit of Fig. 2 under operating conditions; and Fig. 4 shows in fragmentary form a circuit diagram which is a variant of the circuit of Fig. 2.

A condenser, generally indicated at 2 in Fig. 1, is formed of inner and outer spaced concentrically-positioned metal cylinders 4 and 6, which are supported vertically in the fuel tank by suitable insulating supports, as at 8, which may be formed of an electrically insulating plastic material or other suitable material. The outer cylinder 6 is provided with openings 10 so that the level of liquid between the cylinders 4 and 6 corresponds to the level of the liquid in the tank, and the capacity between these cylinders is utilized as a measure of the amount of liquid in the tank. This condenser is of the general type described in the above-identified application.

In Fig. 2, three such condensers, illustrated diagrammatically at 2A, 2B, and 2C, are connected in parallel to terminals 12 and 14 of a remotely-positioned variable-frequency oscillator, generally indicated at 15, by cables 16 and 18, respectively. These cables desirably are shielded to avoid interference which might be caused by the pick-up of stray voltages, and to prevent direct inter-cable capacitance where the cables must be positioned adjacent to each other.

In practice, the condensers are positioned in separate fuel tanks; and the distance between the individual condensers, as well as the distance from the condensers to the oscillator 15, may be considerable. Because of the necessity for relatively long lengths of the connecting cables, the capacity between these cables and ground may be subject to wide variations. For example, this stray capacity will be affected by movement of the flexible cables, and by changes in ambient conditions such as temperature, humidity, etc., and in some applications this variation in cable capacity may even exceed the variation in condenser capacity which is to be measured. The present system provides for accurate measurement of the amount of fuel in spite of such capacity variations, and for the simultaneous measurement of the quantity of fuel in several tanks, so that the total amount of fuel in the tanks is indicated automatically.

An oscillator 15, generally similar to those described in the above-mentioned application, is employed. However, the condensers 2A, 2B, and 2C are arranged to control the oscillator frequency by varying the resonant frequency of a parallel inductance-capacitance circuit, which is so constructed that its resonant frequency is substantially independent of variations in the capacities to ground of the connecting cables.

The oscillator 15 includes two vacuum tubes 22 and 24 which generate a signal, the frequency of which depends upon the total capacitance of the remotely-positioned condensers 2A, 2B, and 2C. The output signal from anode 26 of tube 22 is coupled through a coupling condenser 28 to a control grid 32 of tube 24. Positive voltage is provided for anode 26 through a plate load resistor 34 which is connected to a positive terminal 36 of a conventional-type power supply, indicated in block form at 38.

The tube 24 is connected as a cathode-follower, and its anode 42 is connected directly to power supply terminal 36. Cathode 44 of tube 24 is connected to ground through a load resistor 46 connected in series with a bias resistor 48. Operating bias voltage for this tube 24 is obtained by connecting the control grid 32 through a grid-return resistor 52 to the junction of resistors 46 and 48.

The output voltage of tube 24, appearing at cathode 44 is fed back by means of a positive feed-back network. This network comprises a lead 54, connecting cathode 44 of tube 24 and series isolation resistor 56, which is connected to movable contact 58 of a potentiometer 62 connected between ground and cathode 64 of tube 22.

When the current through tube 22 increases, the voltage at anode 26 decreases, thus driving control grid 32 of tube 24 in a negative direction and causing the plate current through tube 24 to decrease, thus rendering the voltage at cathode 44 less positive with respect to ground. This cathode voltage is fed back by the positive feed-back network to drive cathode 64 of tube 22 in a negative direction, thus further increasing the current through the tube 22.

In addition to the positive feed-back network just described, a negative feed-back network is also provided comprising a resistor 66, a condenser 68, and an inductance 72 connected in series between cathode 44 of tube 24 and control grid 74 of tube 22. A grid return circuit for control grid 74 is provided by means of a fixed resistor 76 extending between the control grid and ground.

These positive and negative feed-back circuits in effect oppose each other, the positive feed-back tending to cause oscillation and the negative feed-back tending to prevent such oscillation. Thus, the oscillator 15 will not oscillate at any frequency at which the negative feed-back action prevails, but it will generate a signal at any frequency within its operating range at which the positive feed-back action prevails. If the negative feed-back circuit is frequency-responsive so that a greater voltage is returned at certain frequencies than at other frequencies, then it is possible to adjust movable contact 58 of potentiometer 62, to control the amount of positive feed-back so that the oscillator 15 will generate a frequency corresponding to the frequency at which the impedance of the negative feed-back circuit is the highest.

In order to provide such a frequency characteristic for the negative feed-back circuit, the tank condensers 2A, 2B, and 2C are connected in parallel with the inductance 72. The cable 18 extends from the end of inductance 72 adjacent to the condenser 68 to the outer cylinders 6A, 6B and 6C of the measuring condensers 2A, 2B, and 2C. The opposite end of inductance 72 is connected by cable 16 to the inner cylinders 4A, 4B, and 4C of these condensers. Because of this parallel connection of the condensers, their capacities are effectively added and are in shunt with the inductance 72 to form a tuned circuit having a resonant frequency which is a function of the total capacity of condensers 2A, 2B, and 2C. This tuned circuit, which is in series with the negative feed-back path has a very high impedance at its resonant frequency. This high series impedance presented by the tuned circuit reduces the negative feed-back by such an amount that the oscillator 15 can generate a signal at that frequency, that is, the resonant frequency of the parallel circuit formed by condensers 2A, 2B, and 2C and inductance 72. Any change in the total capacity of the condensers 2A, 2B, and 2C will cause a change in the resonant frequency of this tuned circuit and will produce a corresponding change in the frequency generated by oscillator 15.

With this arrangement, the frequency of oscillation is substantially independent of the stray capacities between the cables 16 and 18 and ground.

Fig. 3 shows a simplified circuit of this portion of the feed-back arrangement and will serve to provide a clearer understanding of its operation. If we neglect, for the moment, the existence of condnsers 2A, 2B, and 2C in this simplified circuit, the inductance 72 in conjunction with the capacity between cable 18 and ground, represented diagrammatically at 152, and the capacity between cable 16 and ground, represented diagrammatically at 154, forms a low-pass filter. This circuit alone would permit the oscillator to generate a signal only at a frequency sufficiently high that the attenuation of this low-pass filter would prevent the negative feed-back from overcoming the effects of the positive feed-back. The oscillator can easily be arranged so that it will not generate such a high frequency signal, and with most types of construction this will be inherent. It is apparent that when the inductance 72 is shunted with the condensers 2A, 2B, and 2C, at the particular frequency at which this parallel circuit is resonant, the effect of this negative feed-back network will be substantially reduced; and, this frequency being within the operating range of the oscillator, a signal will be generated at the resonant frequency of this parallel tuned circuit and will be substantially unaffected by changes in the values of capacities 152 and 154, even though these capacities are larger than the variation in capacity which is being measured.

The remainder of the indicating circuit is similar to that described in the above-identified application and comprises an amplifier stage, indicated in block form at 76, and a discriminator network, generally indicated at 78.

The signal appearing at control grid 32 of tube 24 is coupled to the input of amplifier 76, which increases the power of the alternating signal generated by the oscillator 15 and isolates the discriminator 78 from the oscillator circuit.

The signal from amplifier 76 is coupled through series-connected primaries 82 and 84 of discriminator transformers 86 and 88, respectively. A secondary winding 92 of transformer 86 is connected in shunt with the series combination of a condenser 96 and an adjustable resistor 98.

The circuit formed by winding 92 and condenser 96 is designed to be resonant near the highest operating frequency of the oscillator 15. A second resonant circuit is formed by a secondary winding 94 of transformer 88, which is connected in shunt with the series combination of a condenser 102 and a variable resistor 104. The resonant frequency of this circuit is near the lower end of the frequency range of the oscillator 15. The variable resistors 98 and 104 are incorporated in these circuits so that their Q can be adjusted manually in order to permit calibration of the "Full" and "Empty" positions of the indicating apparatus.

One terminal of condenser 96 is connected to ground and the other terminal is coupled to an anode 106 of a diode rectifier 108, the cathode 112 of which is connected through a series resistor 114 to one end of a meter actuating coil 116 of a ratiometer, generally indicated at 118. The opposite end of coil 116 is connected to ground through a bias resistor 122.

One terminal of condenser 102 is connected to ground and the other terminal is coupled to an anode 124 of a second diode rectifier 126, the cathode 128 of which is connected through a series resistor 132 to one end of a meter actuating coil 134 of the ratiometer 118. The opposite end of coil 134 is connected to ground through the bias resistor 122. Condensers 138 and 142 are connected between cathodes 112 and 128, respectively, and ground, to filter alternating components from the rectified signals.

The ratiometer 118 may be of conventional design with the deflecting coils 116 and 134 thereof positioned at right angles to each other and connected so as mechanically to control the position of a pointer or indicator 144 which is arranged to cooperate with a suitable scale 146.

As described in the above-referred-to application, the pointer 144 can be arranged to indicate at mid-scale when the currents through coils 116 and 134 are equal, and to move in one direction when the current through coil 116 is greater than that through coil 134, and to move in the opposite direction when the relative magnitudes of these currents are reversed. The magnitudes of the direct currents through these coils depend upon the alternating voltages developed across the condensers 96 and 102, and it is the ratio of these voltages that determines the reading on scale 146. This ratio depends in turn upon the particular frequency being generated by the oscillator 15.

The resistor 98 can be adjusted to control the Q of its resonant circuit so that the pointer 144 indicates correctly when all of the fuel tanks are empty and the total capacity of condensers 2A, 2B, and 2C, therefore, is a minimum. The resistor 104 can be adjusted to regulate the Q of its resonant circuit so that the pointer 144 indicates correctly on the scale 146 when the fuel tanks are full and the total capacity of the condensers 2A, 2B, and 2C, therefore, is a maximum.

From a consideration of the above example, it will be observed that the fuel gauge embodying my invention is well adapted to obtain the ends and objects hereinbefore set forth and to be economically manufactured since the separate components are readily available and easily assembled into the desired structure. It is apparent that the invention is subject to a variety of modifications as may be necessary or desirable in adapting the invention to different uses. For example, such a system may be used when measuring the capacity of only a single remotely positioned condenser in order to avoid errors such as would be caused by capacity effects of long connecting cables, and it has the added advantage that additional capacities can be coupled to the circuit at any time without necessitating modification of the measuring apparatus. It is also apparent that separate cables can be provided for each of the condensers and, by means of a switching arrangement, the measuring circuit can be arranged to indicate the individual capacities of each condenser or the total capacity of all of the condensers as desired.

It is also apparent that although I have described the above invention as embodied in a measuring system for determining the amount of fuel in fuel tanks, that the invention can be readily adapted for other uses wherein the conditions to be measured control the value of a capacitance. For example, it can be used to advantage in industrial measurement of moisture content, wherein the capacitance of two spaced conductive plates depends upon the moisture content of material passing between the plates. In such systems it may be desirable to provide a number of measuring condensers all connected to a single remotely-positioned measuring apparatus and to measure the total capacity of these condensers in order to minimize fluctuations in the indication which would be caused by localized changes in moisture content of the material.

Other applications of the invention may include the measurement of temperature by the use of remotely-positioned temperature-sensitive condensers.

It is also to be understood that inductances can be used as the condition sensitive element with a fixed condenser connected in parallel to operate as described herein.

Fig. 4 shows the measuring circuit illustrated in Fig. 2 so modified. The inductance 72 is replaced by a condenser 148, and the variable condensers 2A, 2B and 2C shown connected in parallel with the inductance 72 in Fig. 2 are collectively replaced by a variable inductance 150. It will be understood that the variable inductance 150 may represent the total of a plurality of variable inductances connected in series with one another, so that the total inductance in parallel with the condenser 148 is the inductance 150. If the magnitude of the condition is liquid level, the inductance 150 may be made variable in response to the liquid level by providing a float 152 connected to an iron core 154, which is arranged to move into and out of the coils of the inductance 150 as the float 152 rises and falls in response to changes in liquid level. The operation of the circuit is otherwise as described above.

Many other applications and modifications will occur to those engaged in the various fields of endeavor, and it is clear, therefore, that the above description is to be interpreted as illustrative rather than exhaustive of the various possible embodiments of this invention.

What is claimed is:

1. Apparatus responsive to the magnitude of a condition for generating an alternating signal, the frequency of which is a predetermined function of said magnitude, comprising a measuring circuit including a capacitive reactance element, an inductive reactance element connected in parallel with said capacitive reactance element, one of said reactance elements being variable as a predetermined function of the magnitude of said condition, and the other of said reactance elements having a fixed value at least during normal operation of the apparatus; and a variable frequency oscillator connected to said measuring circuit and including a vacuum tube having a cathode, an anode and a grid, circuit means providing a positive feed-back path tending to sustain oscillation in said oscillator, circuit means providing a negative feed-back path tending to suppress oscillation in said oscillator except at the resonant frequency of said measuring circuit, and means electrically connecting the parallel connected reactance elements of said measuring circuit in series in said negative feed-back path; so that the high impedance of said parallel connected reactance elements at the resonant frequency thereof will suppress the action of said negative feed-back path and permit oscillation of said oscillator at that frequency which is a predetermined function of the magnitude of said condition.

2. Apparatus according to claim 1, wherein said variable reactance element is positioned remote from said oscillator and is connected thereto by a cable, the impedance of said parallel connected reactance elements at the resonant frequency thereof being so high that stray capacitance effects incident to the employment of said cable under various ambient conditions will not substantially affect the predetermined desired relation between the value of said variable reactance, which is proportional to the magnitude of said condition, and the value of the frequency of said oscillator.

3. Apparatus according to claim 1, wherein said variable reactance element is positioned remote from said oscillator and is connected thereto by a cable, the impedance of said parallel connected reactance elements at the resonant frequency thereof being so high that stray capacitance effects incident to the employment of said cable under various ambient conditions will not substantially affect the predetermined desired relation between the value of said variable reactance, which is proportional to the magnitude of said condition, and the value of the frequency of said oscillator; and wherein said variable reactance element comprises a variable capacitor.

4. Apparatus according to claim 1, wherein said variable reactance element is positioned remote from said oscillator and is connected thereto by a cable, the impedance of said parallel connected reactance elements at the resonant frequency thereof being so high that stray capacitance effects incident to the employment of said cable under various ambient conditions will not substantially affect the predetermined desired relation between the value of said variable reactance, which is proportional to the magnitude of said condition, and the value of the frequency of said oscillator; and wherein said variable reactance element comprises a variable inductor.

5. Apparatus according to claim 1, comprising in addition, means for manually adjusting the relative operating levels of said feed-back paths.

6. Apparatus responsive to the total of the magnitudes of a plurality of conditions for generating an alternating signal, the frequency of which is a predetermined function of such total magnitude, comprising a measuring circuit including a plurality of variable reactance elements which are arranged so that their reactances are proportional to the magnitude of each of said plurality of conditions respectively and which are electrically connected together so that the reactance of all said variable reactance elements as so connected is proportional to the total of the magnitudes of said plurality of conditions, fixed reactance means having a reactance of opposite sign from that of all said variable reactance elements and electrically connected in parallel with all said variable reactance elements; and a variable frequency oscillator connected to said measuring circuit and including a vacuum tube having a cathode, an anode and a grid, circuit means providing a positive feed-back path tending to sustain oscillation in said oscillator, circuit means providing a negative feed-back path tending to suppress oscillation in said oscillator except at the resonant frequency of said measuring circuit, and means electrically connecting the parallel connected reactance elements of said measuring circuit in series in said negative feed-back path; so that the high impedance of said parallel connected reactance elements at the resonant frequency thereof will suppress the action of said negative feed-back path and permit oscillation of said oscillator at that frequency, which is a predetermined function of the magnitude of said condition.

7. Apparatus according to claim 6, in which said variable reactance elements which are respectively responsive to the magnitudes of the plurality of conditions are capacitors, which are connected in parallel with one another, so that the total reactance thereof as thus connected is equal to the sum of the individual reactances thereof; and in which said fixed reactance means is a fixed value inductor.

8. Apparatus according to claim 6, in which said variable reactance elements are positioned respectively at places remote from said oscillator and are connected together and to said oscillator by cables, the impedance of said parallel connected reactance elements at the resonant frequency thereof being so high that stray capacitance effects incident to the employment of said cables under various ambient conditions will not substantially affect the predetermined desired relation between the value of the variable reactances, which is proportional to the total of the magnitudes of said conditions, and the value of the frequency of said oscillator.

9. Apparatus according to claim 1, in which both the common connections between said parallel connected reactance elements are isolated from ground.

10. Apparatus responsive to the magnitude of a condition for generating an alternating signal, the frequency of which is a predetermined function of said magnitude, comprising a measuring circuit including a capacitive reactance element, an inductive reactance element connected in parallel with said capacitive reactance element, one of said reactance elements being variable as a predetermined function the magnitude of said condition, and the other of said reactance elements having a fixed value, at least during normal use of the apparatus; and a variable frequency oscillator connected to said measuring circuit and including first and second vacuum tubes, each having a cathode, an anode and a grid, a source of D. C. power having positive and negative terminals, means electrically connecting the positive terminal of said power source to the anodes of said first and second tubes, means electrically connecting the anode of said first tube to the grid of said second tube, means electrically connecting the cathodes of said tubes to ground, means electrically connecting the grid of said second tube to a point on said means electrically connecting the cathode of said second tube to ground, means electrically connecting the grid of said first tube to ground, means providing a positive feed-back path tending to sustain oscillation in said oscillator, said positive feed-back path including a resistor for electrically connecting the cathode of said second tube to a point on said means electrically connecting the cathode of said first tube to ground, means providing a negative feed-back path tending to suppress oscillation in said oscillator, said negative feed-back path including means electrically connecting the cathode of said second tube to the grid of said first tube and including a resistor and a condenser, which are in series with said measuring circuit reactance elements; said apparatus being so constructed and arranged that said oscillator will generate an alternating signal at the resonant frequency of said measuring circuit, such that the frequency of said alternating signal will be a predetermined characteristic function of the magnitude of said condition.

11. Apparatus responsive to the total of the magnitudes of a plurality of conditions for generating an alternating signal, the frequency of which is a predetermined function of said magnitudes, comprising a measuring circuit, including a plurality of capacitive reactance elements all connected in parallel, an inductive reactance element of fixed value connected in parallel with said capacitive reactance elements, said capacitive elements being variable respectively as a predetermined function of the magnitudes of said conditions; and a variable frequency oscillator connected to said measuring circuit, and including first and second triodes, each having a cathode, an anode and a grid, a source of D. C. power having positive and negative terminals, said negative terminal being grounded, a conductor electrically connecting the positive terminal of said power source to the anode of said second triode, means including a plate load resistor for electrically connecting the positive terminal of said power source to the anode of said first triode, means including a coupling condenser for electrically connecting the anode of said first triode to the grid of said second triode, means including a load resistor and a bias resistor connected in series for electrically connecting the cathode of said second triode to ground, mean including a first grid return resistor for electrically connecting the grid of said second triode to a point between said load resistor and said bias resistor, means including a potentiometer type resistance element for electrically connecting the cathode of said first triode to ground, means including a second grid return resistor for electrically connecting the grid of said first triode to ground, means providing a positive feed-back path tending to sustain oscillation in said oscillator, said positive feed-back path including a series isolation resistor for electrically connecting the cathode of said second triode to the variable tap of said potentiometer type resistance element, means providing a negative feed-back path tending to suppress oscillation in said oscillator, said negative feed-back path including a resistor and a condenser, which are in series with said measuring circuit reactance elements, connected in series from the cathode of said second triode to the grid of said first triode; said apparatus being so constructed and arranged that said oscillator will generate an alternating signal at the resonant frequency of said measuring circuit, such that the frequency of said alternating signal will be a predetermined characteristic function of the total of the magnitudes of all said conditions.

CARL G. SONTHEIMER.

REFERENCES CITED

The following references are of record in the file of this patent:

UNITED STATES PATENTS

| Number | Name | Date |
|---|---|---|
| 2,280,678 | Waymouth | Apr. 21, 1942 |
| 2,409,073 | Sias et al. | Oct. 8, 1946 |
| 2,447,248 | Harris | Aug. 17, 1948 |
| 2,494,934 | Doucette | Jan. 17, 1950 |

FOREIGN PATENTS

| Number | Country | Date |
|---|---|---|
| 385,265 | Great Britain | 1933 |